United States Patent Office 3,623,859

Patented Nov. 30, 1971

3,623,859

PROCESS OF MAKING ACICULAR, STABLE MAGNETIC IRON PARTICLES

Frederick Thomas Aldridge, Belmont, Calif., assignor to Ampex Corporation, Redwood City, Calif.

No Drawing. Filed May 22, 1970, Ser. No. 39,882
Int. Cl. C22b *5/12;* C21c *15/00;* B22f *9/00*
U.S. Cl. 75—.5 AA 6 Claims

ABSTRACT OF THE DISCLOSURE

Acicular iron particles are made by doping an acicular ferric oxide with bismuth and reducing the doped oxide to iron at a relatively low temperature. The particles are stabilized by reoxidizing the surface slightly.

SUMMARY OF THE INVENTION

The magnetic particles generally used in making magnetic recording elements, such as magnetic tapes, generally consist of acicular gamma ferric oxide. It has been long recognized that iron itself would be superior to gamma ferric oxide with respect to signal to noise ratio, magnetic moment and coercive force. However, iron itself suffers from two difficulties. In the first place, it has heretofore been almost impossible to produce iron particles of the desired acicular shape. If one starts with acicular iron oxide particles and reduces them, invariably there is some sintering and the desired acicular shape is lost. The second deficiency is that iron particles in the sub-micron range ordinarily used in making magnetic tapes are pyrophoric. These two deficiencies of iron have prevented any substantial use of iron in making magnetic recording elements, despite the recognized advantages of pure iron.

The present invention solves both of these deficiencies. It has been found that if one starts with acicular iron oxide (either red alpha ferric oxide or yellow hydrated ferric oxide) and dopes the iron with a small amount of a bismuth salt and reduces the iron oxide under relatively mild conditions, the acicular shape is preserved. Further, if one cautiously admits air to the cooled, reduced iron oxide particles, the surface of the iron is mildly oxidized and the oxide surface stabilizes the iron, preventing it from being pyrophoric.

Any soluble bismuth salt can be used and preferably one employs a chelating agent to hold the bismuth in solution. The amount of bismuth salt is selected so that the percentage of bismuth based on the iron (both as metal) is from about 1 to 20% by weight. The optimum percentage is about 5%. The iron oxide is then reduced in a hydrogen atmosphere at a temperature of not over 500° C. and preferably not over 350° C. There is no real lower limit as to temperature but at low temperatures, the reaction goes very slowly so that from a practical standpoint, one should employ a temperature of at least 250° C. in order to avoid impractically long reaction times although temperatures as low as 200° C. can be employed. A temperature of about 320° C. is optimum. After the reaction has gone to completion the reactor is cooled. A mixture of 1% air and 99% nitrogen is then admitted to the reactor and at intervals of 30 to 45 minutes the percentage of air in the mixture is doubled. At the same time the temperature in the kiln is observed and if it rises to more than about 50° C., the increases in air flow are suspended until it drops again. After four or five hours, pure air is flowing through the kiln and the iron particles can now be removed and made into tape or other magnetic recording media.

The starting material for the synthesis is commercially available acicular hydrated yellow iron oxide. It is convenient to dehydrate this to red alpha ferric oxide by heating it to about 350° C. before it is doped with bismuth but it is also possible to dope the yellow iron oxide directly, prior to dehydration.

The doping is accomplished by mixing the dry iron oxide with a solution of a bismuth salt. The bismuth salt should be one which is soluble in water or other solvent which does not attack the iron oxide. Bismuth nitrate is suitable for this purpose but bismuth nitrate has a tendency to hydrolize immediately upon being mixed with water and precipitate out the bismuth. Therefore, it is preferable that a chelating agent be used to maintain the salt in solution and prevent it from reacting with water. Suitable chelating agents include mannitol and sorbitol. The solution volume is chosen so that when the solution of the bismuth salt is mixed with the iron oxide, the oxide is wet all over. A solution volume of about 70 ml. per hundred grams of red oxide is optimum. With a lower volume, it is difficult to wet all of the oxide evenly while with a larger volume the oxide cakes together to form a slurry. After the iron oxide is wet with a bismuth salt, it is dried at about 100° C. for about 15 minutes.

In preparing the bismuth solution, a suitable technique is to use about 50 grams of mannitol and 500 ml. of cold water. A quantity of 81 grams of bismuth nitrate, $Bi(NO_3)_3 \cdot 5H_2O$ is then dissolved in this solution. 55 ml. of this solution diluted to 70 ml. with water is used to dope 100 grams of red iron oxide to give a bismuth to iron weight percentage of 5%.

The reduction of iron oxide to iron can be carried out in a small electrically heated rotary kiln or other form of reactor at the desired temperature range. The kiln is charged with the bismuth doped iron oxide and the kiln is heated to 300° C. while a stream of nitrogen is fed through the kiln. After about 1 hour, the mannitol and bismuth nitrate have been decomposed and the gaseous decomposition products of $CO_2$, $H_2O$ and $NO_2$ are drawn from the kiln. Hydrogen gas is now introduced and the temperature changed to the desired reduction temperature. Preferably the hydrogen is dried before introduction since the presence of a small amount of water increases the reduction time sufficiently to cause some sintering and loss of desired magnetic properties. Normally the reduction requires about 6 hours.

DESCRIPTION OF THE PREFERRED EMBODIMENTS

The following non-limiting examples illustrate preferred embodiments of the invention.

EXAMPLE 1

Five grams of mannitol are dissolved in 50 ml. of water. 8.1 grams of $Bi(NO_3)_3 \cdot 5H_2O$ are dissolved in this solution, with the mannitol acting as a chelating agent to hold the bismuth in solution. Five ml. of this solution is mixed with 10 grams of red alpha iron oxide. The wet oxide is dried at 110° C. The weight ratio of bismuth to iron in this mixture is 5 to 95.

200 mg. of this mixture is placed in a 16 mm. diameter crucible in a reactor. The sample is heated to 320° C. in a stream of hydrogen gas and reduced to iron. The reduction requires about six hours. The sample is cooled and air admitted slowly into the system until an oxide layer has formed on the particles which stabilizes them against further oxidation, utilizing the following procedure:

A mixture of 1% air and 99% nitrogen is then passed through the reactor and at intervals of 30 to 45 minutes, the percentage of air in the mixture is doubled. At the same time the temperature in the reactor is observed and if it rises to more than about 50° C., the increase in air flow are suspended until it drops again. After four or five hours, pure air is flowing through the reactor and the iron particles can now be removed and made into tape or other magnetic recording media. The iron particles formed are acicular, with a length to width ratio of about five to one and an average length of about 0.5 micron. The bulk powder has a magnetic saturation moment of 142 emu/gram, a squareness ratio of 0.44 and a coercivity of 1020 oersteds. It is non-pyrophoric.

EXAMPLE 2

The procedure of Example 1 was repeated, except that a temperature of 350° C. was used for the reduction. The reduction required 3 hours. The particles had an appearance similar to those of Example 1, but were somewhat more sintered. The bulk powder had a saturation magnetic moment of 148 emu/gram, a squareness ratio of 0.41 and a coercivity of 866 oersteds.

EXAMPLE 3

The procedure of Example 1 was repeated except that a temperature of 280° C. was used for the reduction. The reduction required 22 hours. The particles had a size and appearance similar to those of Example 1, but individual particles had an appearance of being composed of chains of smaller particles. The bulk powder had a saturation moment of 139 emu/gram, a squareness ratio of 0.48 and a coercivity of 1170 oersteds.

EXAMPLE 4

The procedure of Example 2 was repeated except that 2 ml. of the bismuth nitrate solution was used, so that t heoxide had a weight ratio of bismuth to iron of 2 to 98. The resulting particles are more sintered and less acicular than those of Example 2. The bulk powder had a saturation magnetic moment of 150 emu/gram, a squareness ratio of 0.39 and a coercivity of 757 oersteds.

EXAMPLE 5

The procedure of Example 2 was repeated except that 10 ml. of the bismuth nitrate solution was used so that the oxide had a weight ratio of bismuth to iron of 10 to 90. The resulting particles are similar in appearance to those of Example 2. The bulk powder had a saturation moment of 147 emu/gram, a squareness ratio of 0.42 and a coercivity of 863 oersteds.

EXAMPLE 6

Fifty grams of mannitol are dissolved in 500 ml. of water. 81 grams of $Bi(NO_3)_3 \cdot 5H_2O$ are dissolved in this solution. 70 ml. of this solution is mixed with 150 grams of red alpha iron oxide to form a bismuth doped iron oxide with a bismuth to iron weight ratio of 5 to 95. The oxide is dried for two hours at 110° C. in an oven and then placed in a rotary kiln of about one quart capacity. The kiln is heated to 320° C. in an electric furnace while it is being rotated at about 18 r.p.m. Hydrogen is passed through the kiln at a rate of 10 liters per minute until the absence of water in the exhaust stream indicates that the reduction is completed. About seven hours is required. The kiln is cooled to room temperature while nitrogen is passed through it, and a mixture of air and nitrogen is admitted to form a stabilizing oxide layer. The slow air admission, as described in Example 1 requires about six hours. The particles are similar in appearance and size to the particles formed in Example 1. The bulk powder has a saturation moment of 144 emu/gram, a squareness ratio of 0.42 and a coercivity of 885 oersteds.

EXAMPLE 7

The procedure of Example 1 was repeated except that the starting material was 170 grams of yellow iron oxide which had been doped to contain 5% bismuth by weight. This was reduced in the furnace under hydrogen at a temperature of 320° C. for about 8 hours. Prior to reduction, the mixture was heated under nitrogen for 15 minutes to decompose the mannitol and the bismuth nitrate. After cooling, the iron powder was tested and found to have a magnetic saturation of 146 emu/gram, a squareness ratio of .43 and a coercivity of 986 oersteds.

EXAMPLE 8

A tape was manufactured by preparing a dispersion which consisted of, on a solids basis, 60% by weight of iron particles prepared in accordance with Example 6 and 40% of a polyurethane resin. A polyester base was coated to a thickness of 0.26 mil. The tape was tested and was found to have the following properties:

$B_m$ at 3000 oe. field—2620 gauss
$B_r$—1480 gauss
$H_c$—800 oersted
Squareness—0.57
RF output (Ref=100%)—212%
Noise (Ref=0 db)—3.9 db improvement
(Reference was similar tape made with gamma ferric oxide.)

I claim:

1. A process for producing acicular iron particles comprising doping a material selected from acicular yellow ferric oxide and acicular red ferric oxide with bismuth wherein the amount of bismuth to iron is from about 1 to 20% by weight and reducing the ferric oxide to iron in a stream of hydrogen at a temperature of from 200° C. to 500° C.

2. The process of claim 1 wherein the oxide is doped by wetting the surface of the iron oxide particle with a solution of a bismuth salt.

3. The process of claim 2 wherein the oxide is doped with an aqueous solution of bismuth nitrate stabilized a chelating agent.

4. The process of claim 1 wherein after reduction the iron is slowly oxidized to produce an oxidized surface, rendering said iron particles non-pyrophoric.

5. The process of claim 1 wherein the reaction is conducted at a temperature of about 320° C.

6. The process of claim 4 wherein the iron particles are cooled to about room temperature after reduction, and a mixture containing about 1% air and 99% nitrogen is introduced over the particles and wherein the percentage of air is slowly increased, said increase in air flow being restricted to produce a temperature of not over 50° C., until pure air can flow over the product without causing a temperature rise.

References Cited

UNITED STATES PATENTS

| | | | |
|---|---|---|---|
| 2,578,800 | 12/1951 | Hamister | 75—0.5 BA |
| 2,879,154 | 3/1959 | Campbell | 75—0.5 BA |
| 3,347,659 | 10/1967 | Volk et al. | 75—0.5 BA |

HYLAND BIZOT, Primary Examiner

G. K. WHITE, Assistant Examiner

U.S. Cl. X.R.

75—0.5 BA; 148—105